United States Patent [19]

Kull et al.

[11] Patent Number: 5,150,681
[45] Date of Patent: Sep. 29, 1992

[54] SUPERVISORY SYSTEM FOR A VEHICLE ACCELERATOR PEDAL TRAVEL TRANSDUCER

[75] Inventors: Hermann Kull, Stuttgart; Joachim Berger, Winterbach; Ulrich Gerstung, Vaihingen/Enz; Klaus Bleuel, Oestrich-Winkel, all of Fed. Rep. of Germany

[73] Assignee: Robert Bosch GmbH, Stuttgart, Fed. Rep. of Germany

[21] Appl. No.: 688,489

[22] PCT Filed: Sep. 21, 1989

[86] PCT No.: PCT/EP89/01099

§ 371 Date: May 21, 1991

§ 102(e) Date: May 21, 1991

[87] PCT Pub. No.: WO91/04400

PCT Pub. Date: Apr. 4, 1991

[51] Int. Cl.$^5$ .............. F02D 11/10; F02D 41/22; B60Q 1/44
[52] U.S. Cl. .................. 123/399; 73/118.1; 123/198 D; 123/479
[58] Field of Search ........... 123/361, 399, 479, 198 D, 123/494, 339; 73/118.1

[56] References Cited

U.S. PATENT DOCUMENTS

| | | | |
|---|---|---|---|
| 2,824,921 | 2/1958 | Baumheckel | 200/86.5 |
| 4,488,527 | 12/1984 | Pfalzgraf et al. | 123/399 |
| 4,505,357 | 3/1985 | Pfalzgraf et al. | 123/361 X |
| 4,509,480 | 4/1985 | Kull et al. | 123/359 |
| 4,515,125 | 5/1985 | Buck et al. | 123/359 |
| 4,791,900 | 12/1988 | Buck et al. | 123/359 |
| 4,854,283 | 8/1989 | Kiyono et al. | 123/399 X |
| 4,920,939 | 5/1990 | Gale | 123/399 |
| 4,993,384 | 2/1991 | Wiggins et al. | 123/399 |
| 5,050,552 | 9/1991 | Riehemann | 123/399 X |

FOREIGN PATENT DOCUMENTS 3743308 6/1989 Fed. Rep. of Germany.

OTHER PUBLICATIONS

"Elektronische Motorsteuerung für Kraftfahrzeuge" by Gerhard Kolberg in MTZ Motortechnische Zeitschrift, 46, vol. 4, (May 1985), pp. 129-133.

*Primary Examiner*—Tony M. Argenbright
*Attorney, Agent, or Firm*—Walter Ottesen

[57] ABSTRACT

In a supervisory system (FIG. 7) for the accelerator pedal transducer (26) in an electronic engine control (EMS) for a vehicle engine, the output signal (U-FFG) of the transducer (26) is interpreted to show whether or not the transducer is at or close to the idling position. The resulting information is compared with the states of idling and pressure switches (18, 28) which shows whether or not the accelerator pedal (30) is actually at or close to its idling position. A contradiction resulting from this comparison indicates a fault and remedial action can be taken by the EMS, for example, to reduce the engine power to a precautionary value. A contradiction between other comparisons shows that one of the switches (18, 28) is faulty. In the event of the accelerator pedal sticking in a depressed position after the driver has lifted his foot and depressed the brake (FIG. 5) a brake signal (BS) can be passed through a gating circuit controlled by the idling switch signal (FFG-LL) to produce a reaction signal(RS). The EMS processes the latter to reduce the engine power to a precautionary safe value.

27 Claims, 5 Drawing Sheets

5,150,681

SUPERVISORY SYSTEM FOR A VEHICLE ACCELERATOR PEDAL TRAVEL TRANSDUCER

FIELD OF THE INVENTION

The invention relates to a supervisory system for monitoring the accelerator pedal travel transducer in an electronic control system for a combustion engine

BACKGROUND OF THE INVENTION

An electronic control system to which the invention may be applied is described in an article entitled "Elektronische Motorsteuerung fuer Kraftfahrzeuge" published in "MTZ" Motortechnische Zeitschrift, year 46, Vol. 4, 1985, published by Franckh'sche Verlagshandlung Stuttgart. In this article, it is explained that electronic engine control (called "EMS" for short) means a system in which the conventional mechanical linkage between the accelerator pedal and the element (the throttle valve in a petrol engine or the regulating rod in a diesel injection pump) determining the engine output is replaced by an electrical connection comprising a pedal travel transducer (potentiometer) actuated by the accelerator pedal and an actuator (servomotor) actuating the said element.

The above article describes in particular a system (now sometimes called "E-gas") in which the servomotor adjusts the throttle valve in carburetor or petrol injection engine. U.S. Pat. Nos. 4,515,125 and 4,509,480 describe supervisory systems of the initially recited kind which are used for electronic diesel control (EDC). The two patent specifications disclose the use of a separate switch for detecting whether or not the accelerator pedal is in its idling position. The EDC performs a "signal-range check" to monitor the occurrence of faults in the operation of the system. Amongst other parameters, the accelerator pedal position is monitored and, for the purpose of the signal-range check, a separate idling switch, actuated when the accelerator pedal is in its idling position, may be used rather than the pedal travel transducer. The purpose of carrying out the signal-range check on the accelerator pedal position is to ensure that appropriate measures are taken by the EDC to prevent too large an injected fuel quantity if a fault should occur in the pedal travel transducer whereby the latter gives a signal corresponding to a substantially greater injectd fuel quantity than is desired by the driver.

Disadvantages of the supervisory systems described in U.S. Pat. Nos. 4,515,125 and 4,509,480 are that they cannot respond to all fault conditions and cannot pinpoint faults when they occur, for example, in the accelerator travel transducer.

SUMMARY OF THE INVENTION

The invention also relates to a supervisory system for monitoring accelerator pedal travel transducers in an electronic control system for a combustion engine. The system has an idling switch which detects the idling position of the accelerator pedal, in which the actual output signal (U-FFG) from the pedal travel transducer is interpreted and is compared with an output signal to be expected when the accelerator pedal is at or close to the idling position. A fault indication is produced when the information obtained from this comparison contradicts the pedal position information derived from the idling switch.

Such a system is briefly described in EP-A-0109478. However, such a system lacks reliability in that it does not necessarily fail safe. Should one of the connections to the idling switch be broken, this may not show up and the supervisory system can then not respond to a sticking travel tranducer.

The invention furthermore relates to a supervisory system for the accelerator pedal travel transducer in an electronic control system for a combustion engine installed in a vehicle. The system has an idling switch, which detects the idling position of the accelerator pedal, and a brake switch responsive to actuation of the vehicle brakes.

Such a system is described in U.S. Pat. No. 4,791,900. In
this system the brake switch, which may be the stoplight switch, is used as a redundant switch for producing a brake signal (BS) which is used to monitor the operation of the idling switch associated with the accelerator pedal. Operation of the brake normally implies that the driver has released the accelerator pedal so that the latter should already be in its idling position. The output signal (LGS) from the idling switch is processed in the EDC in addition to the output signal (U-FFG) from the pedal travel transducer. The brake signal (BS) may also be used to switch off automatic velocity control when the EDC is designed for such control.

However, it has hitherto not been possible to take appropriate measures in an EMS in the event of the accelerator pedal sticking in a depressed position, for example, due to a foot mat being rucked up, or the accelerator pedal travel transducer sticking, although the latter event can be detected if the idling switch is structurally independent of the travel transducer.

According to a feature of the invention, the idling switch is a pressure switch actuated by take up of a lost motion travel of the accelerator pedal from its idling stop before the pedal travel transducer is itself displaced from its idling position. Enhanced redundance is obtained through the use of a pressure switch separate from the travel transducer. The computer logic can correctly diagnose the locality of a fault and in this respect, supervision of the redundant components is important as otherwise a fault in the redundant signals would lead to a complete absence of safety.

A simple arrangement is achieved in that operation of the accelerator pedal through the above-mentioned lost motion travel is executed against a relatively light spring force from a stop position to an idling position at which the pedal travel transducer begins to respond. Also, no fault in the pedal travel transducer is diagnosed over tolerance ranges of triggering of the pressure switch and the output signal (U-FFG) of the travel transducer, in that no fault signal is obtained over the cumulative transducer output range (U-FFG-MIN to U-FFG-LLO) corresponding to these tolerance ranges whether the pressure switch is open or closed.

According to another feature of the invention, the system includes an additional idling switch which is mechanically coupled to or associated with the pedal travel transducer. The actual output signal (U-FFG) from the pedal travel transducer is interpreted and compared with an output signal to be expected when the pedal travel transducer is at or close to the idling position and a fault indication is produced when the result of such comparison contradicts the transducer position information (LGS) derived from the idling switch and- /or the pedal position information (PDS) obtained from the pressure switch.

According to another embodiment, signals are obtained, whereby the reliability of the supervision is further improved. Although the increased complexity resulting from the provision of two switches rather than one leads to an increased possibility of a fault arising in the supervisory system itself, e.g. cable faults, it is possible to detect a fault in a switch or in its circuitry and to exclude the defective redundant signal during continued monitoring. The driver can thereby be warned of the presence of a fault but can carry on driving normally with continued supervision of the pedal travel transducer.

An improved system for detecting the sticking of the accelerator pedal in a depressed position is obtained in that the outputs (FFG-LL, BS) of the idling and/or pressure switch and a brake switch responsive to actuation of the vehicle brakes are compared to produce a reaction signal (RS1) if the accelerator pedal, or at least the accelerator pedal travel transducer is remote from its idling position when the brakes are actuated. An improved system for detecting the sticking of the accelerator pedal in a depressed position is also obtained in that the outputs (BS, FFG-LL) of the two switches are compared to produce a reaction signal (RS) if the accelerator pedal or at least the accelerator pedal travel transducer is remote from its idling position when the brakes are actuated.

Preferably, the reaction signal is used to reduce the engine power to what is considered to be a safe value, in that the electronic engine control so responds to the reaction signal (RS1) that the engine power is thereby reduced to a predetermined safe value $Q_s$.

It is recommended that the reaction signal be effective to reduce the power output only after a short delay in that the electronic engine control so responds to the reaction signal (RS1) that the engine power is thereby reduced, if the engine speed is above a safe value and the engine speed is controlled down to this safe value. Also, it is advantageous to reduce power along a ramp in that the electronic engine control only responds to the reaction signal (RS1) after a delay time.

BRIEF DESCRIPTION OF THE DRAWINGS

The invention is further described, by way of example, with reference to the accompanying drawings, in which.

DESCRIPTION OF THE PREFERRED EMBODIMENTS OF THE INVENTION

Figure 1:
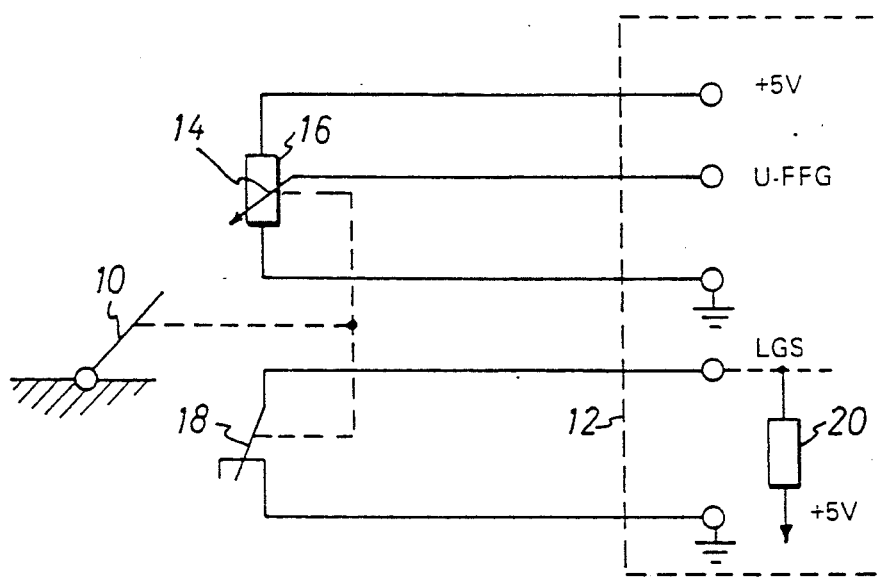
FIG. 1 is a circuit diagram of a supervisory system for monitoring an accelerator pedal travel transducer.

FIG. 1 shows a supervisory system for the accelerator pedal 10 of an electronic engine control (EMS) for a mechanically propelled vehicle. The EMS includes a main computer 12 by means of which the engine power is controlled in accordance with the position of the accelerator pedal 10 and in accordance with operating parameters, such as engine speed. Such an EMS for a diesel engine is described in U.S. Pat. No. 4,791,900 and one for a petrol engine is briefly described in the above-mentioned article by Gerhard Kolberg.

The accelerator pedal 10 is mechanically coupled to the slider 14 of a potentiometer 16 which serves as the accelerator pedal travel transducer. The ends of the potentiometer are connected between a 5 V source and earth in the main computer 12 and the pedal position signal U-FFG appearing on the slider 14 is processed in the computer 12 to set the injected fuel quantity in the case of a diesel engine or to set the air inlet throttle valve in the case of a petrol engine, in accordance with the driver's wishes.

The accelerator pedal 10 is also mechanically coupled to an "idling" switch 18 one pole of which is connected via a resistor 20 in the computer 12 to a 5 V source and the other pole of which is connected to earth. The switch 18 is a normally-closed switch and is opened as soon as the accelerator pedal 18 has been depressed a short distance. Thus an idling position signal FFG-LL appears as earth potential on the terminal LGS of the resistor 20 when the pedal 10 is at or very close to its idling position whereas a pedal-actuated signal FFG-LL appears as a 5 V potential on the resistor terminal LGS when the driver depresses the accelerator. The idling switch 18 is used to monitor the operation of the pedal travel transducer 16.

Figure 2:
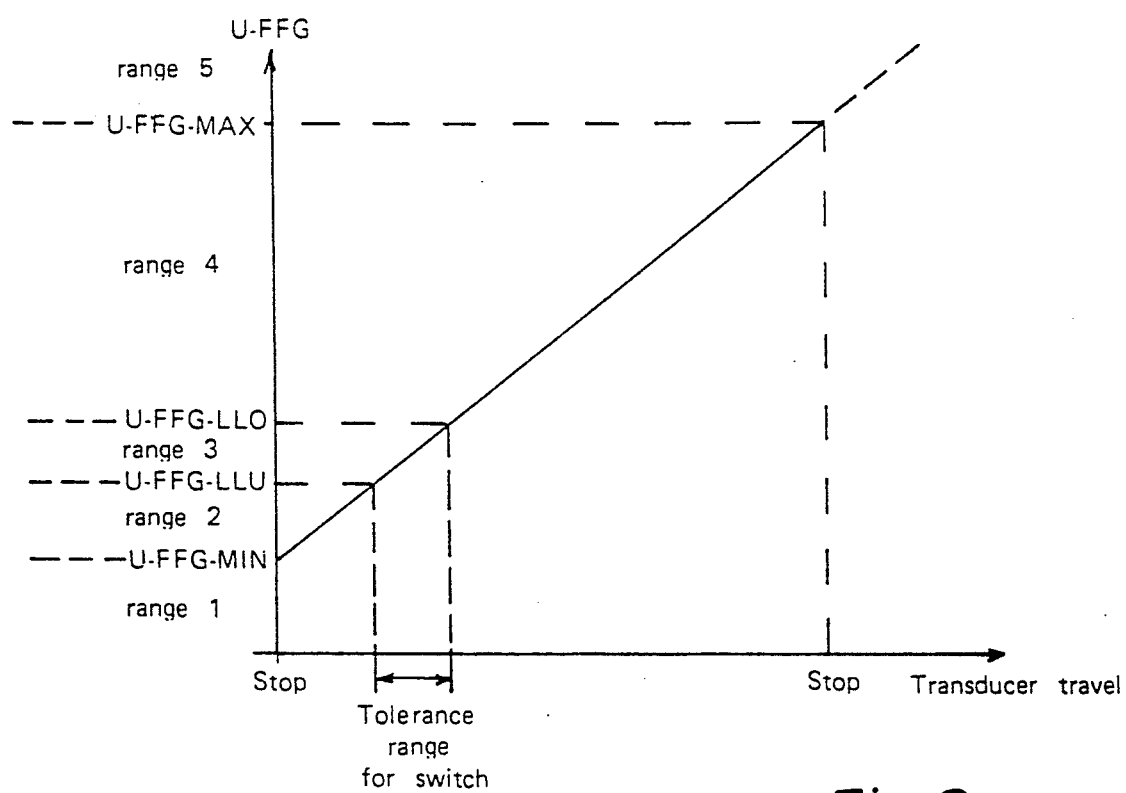
FIG. 2 is a graph relating to the embodiment of FIG. 1 in which the transducer output is plotted against the detected travel.

As shown in FIG. 2, the transducer output voltage U-FFG is proportional to the position of the slider 14 which is dependent on the depression of the accelerator pedal. This output voltage is divided into five ranges, namely range 1: U-FFG < U-FFG-MIN
range 2: U-FFG-MIN < U-FFG < U-FFG-LLU
range 3: U-FFG-LLU < U-FFG < U-FFG-LLO
range 4: U-FFG-LLO < U-FFG < U-FFG-MAX
range 5: U-FFG-MAX < U-FFG where U-FFG-MIN and U-FFG-MAX are the transducer output voltages when the accelerator pedal is against its idling and full load stops, respectively, and U-FFG-LLU and U-FFG-LLO are the transducer output voltages at the minimum and maximum ends of the tolerance range for the opening or closing of the idling switch in relation to the transducer output voltage U-FFG during the first part of the pedal travel away from its idling stop. Table 1 is a plausibility diagram representing the operation of the supervisory system of FIG. 1.

TABLE 1

| actual transducer output voltage (U-FFG) | idling switch | processed value or symptom | diagnosis |
| --- | --- | --- | --- |
| range 1 | LL | idling speed (optional) | faulty transducer |
| | L̄L̄ | elevated idling speed | faulty transducer |
| range 2 | LL | U-FFG | — |
| | L̄L̄ | elevated idling speed | faulty transducer or faulty switch |
| range 3 | LL | U-FFG | — |
| | L̄L̄ | | |
| range 4 | LL | elevated idling speed | faulty transducer or faulty switch |
| | L̄L̄ | U-FFG | — |
| range 5 | LL | idling speed (optional) | faulty transducer |
| | L̄L̄ | elevated idling speed | faulty transducer |

Table 1 demonstrates the ability of the supervisory system to respond to faults in the pedal transducer and in the idling switch, provided that the idling switch switches over within the prescribed tolerance band and provided that the output voltage U-FFG of the pedal transducer is within the prescribed tolerance band for all positions of its slider. This last feature is not shown in FIG. 2 but may be deduced therefrom. In known systems it is not possible to detect the fault that the idling switch has stuck in its full load position.

It is advantageous from the point of view of likelihood of failure that the idling switch 18 closes to earth in the idling position and is connected via a resistor 20 to a voltage source (failure mode and effects analysis).

In relation to a pure signal-range check, improved emergency or stand-by driving conditions can be obtained, in that a speed at least between idling and elevated idling can be selected when there is a signal-range fault with the redundant signal (optional digital function indicated in Table 1).

Figure 3:
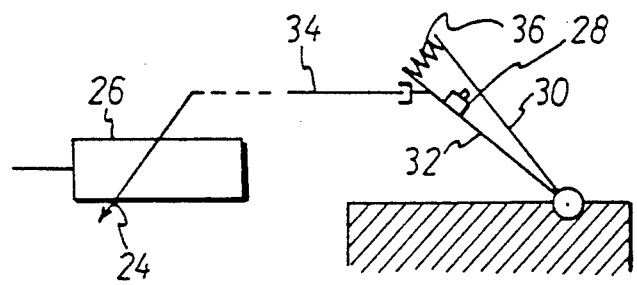
FIG. 3 is a diagrammatic illustration of the arrangement of a pressure switch in accordance with the invention.

In FIGS. 1 and 2 and in Table 1, it is assumed that the idling switch is directly coupled to the accelerator pedal travel transducer, whereby the latter must be displaced slightly from its idling position before the idling switch is actuated. A higher degree of redundance can be obtained by making the idling position switch 28 completely separate from the travel transducer 26, as shown in FIG. 3. The accelerator pedal 30 is made separate from a pedal lever 32 and acts on the latter via the idling position switch 28, which is hereinafter referred to as a pressure switch, inasmuch as it is responsive to pressure applied to the pedal 30. The pedal lever 32 acts via a connecting rod 34 on the slider 24 of the potentiometer 26, serving as the travel transducer. A light return spring 36 acts between the pedal lever 32 and the pedal 30.

Figure 4:
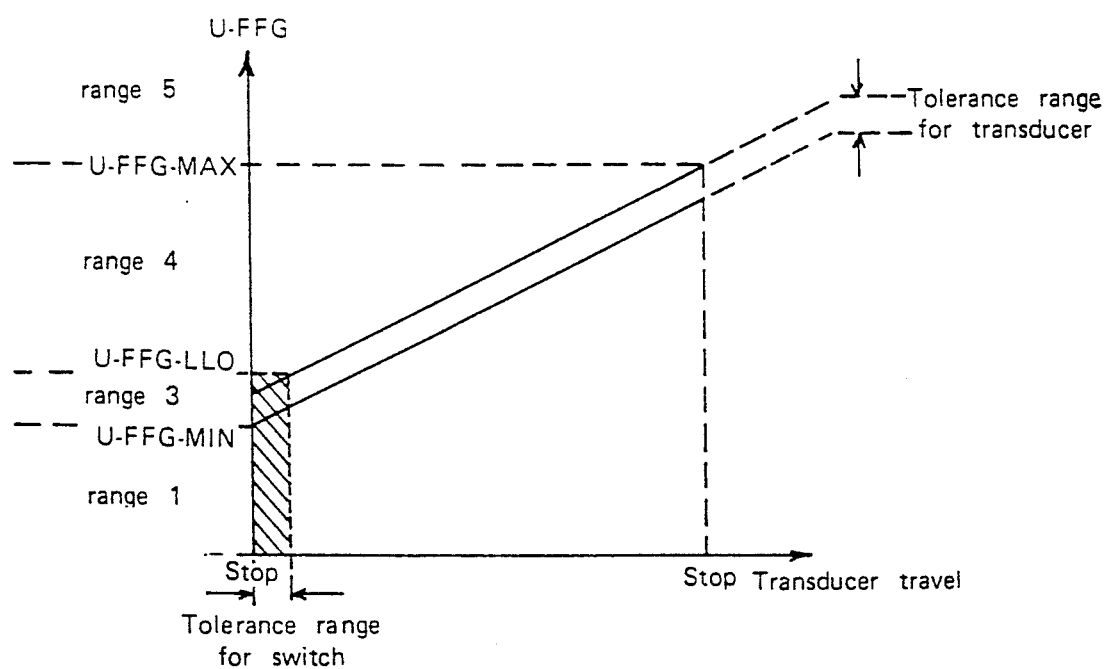
FIG. 4 is a graph, similar to FIG. 2, but relating to the embodiment of FIG. 3.

Initially, the pedal 30 is in a position, as shown, which can be said to be a position below idling position. When the driver first depresses the pedal 30, an initial tolerance clearance between the pedal 30 and the pressure switch 28 which is shown mounted on the lever 32 is taken up. Further depression of the pedal 30 actuates the pressure switch 28. Only after the switch travel is taken up does the pedal lever 32 begin to move and thereby displace the travel transducer 26 from its idling position. The effect is shown in the graph of FIG. 4 and Table 2 below, wherein the symbols have the same meaning as in FIG. 2 and Table 1.

TABLE 2

| actual transducer output voltage (U-FFG) | pressure switch | processed value or symptom | diagnosis |
| --- | --- | --- | --- |
| range 1 | LL | idling speed* | faulty transducer |
| | L̄L̄ | elevated idling speed | |
| range 3 | LL | U-FFG | — |
| | L̄L̄ | | |
| range 4 | LL | elevated idling speed* | faulty transducer* |
| | L̄L̄ | U-FFG | — |
| range 5 | LL | idling speed* | faulty transducer |
| | L̄L̄ | elevated idling speed | |

*These symptoms or diagnosis only apply in the case wherein the idling position switch is perceived as being intact Because the pressure switch 28 and the potentiometer 26 are mechanically independent of one another, a sticking potentiometer slider 24 can be detected in that the return spring 36 releases the switch 28 when the driver lifts his foot from the pedal 30.

A disadvantage as compared with the embodiment of FIGS. 1 and 2 is that it is not possible to arrange for the actuation or triggering of the pressure switch to take place at a transducer output voltage U-FFG slightly above the idling value U-FFG-LL because only a limit switch can be used to achieve the objects of the embodiment of FIGS. 3 and 4.

For a complete supervision of the redundance, a special logic circuit is needed in order to identify the location of a fault unambiguously.

Figure 5:
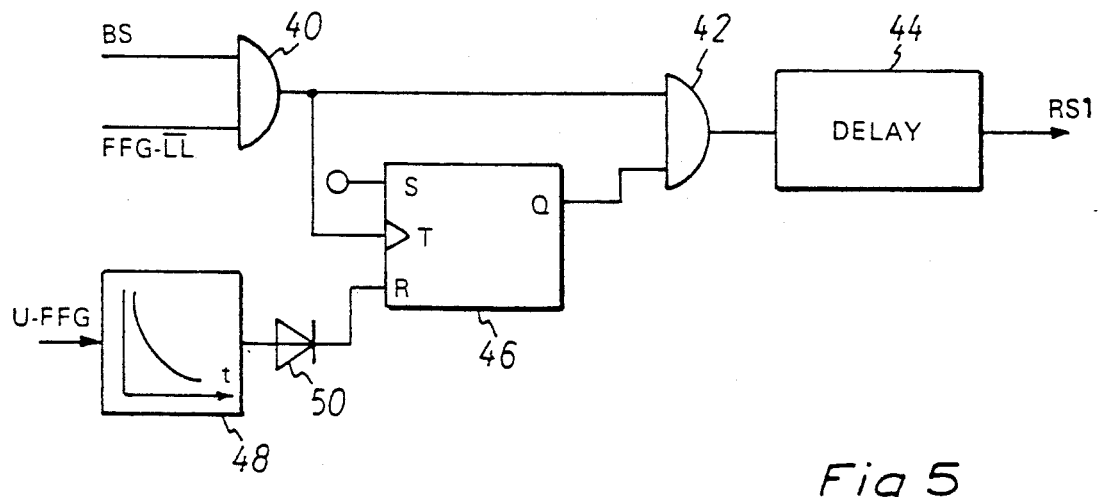
FIG. 5 is a circuit diagram of a supervisory system for monitoring sticking of the accelerator pedal.

The circuit of FIG. 5 can be used to supervise the dynamic operation of the accelerator pedal travel transducer 16,26. This is achieved by monitoring a brake actuation signal BS to ascertain whether the brakes are applied (implying that the driver requires the idling power output) when the accelerator pedal is not in its idling position, for example, due to it being held depressed or partly depressed by a rucked mat.

To this end, a braking signal BS, which may be produced by the usual brake light switch, and the idling position signal FFG-LL, meaning the accelerator pedal is not in its idling position, are fed to an AND gate 40. The output of the AND gate 40 is fed via another AND gate 42 and a delay circuit 44 to provide a reaction signal RS1. The output of the AND gate 40 is also applied to the input T of an integrator in the form of a counter 46 whose output Q is connected to a second input of the AND gate 42. The signal U-FFG from the accelerator pedal travel transducer is fed to the input of a differentiator 48 whose output is applied via a rectifier gate 50 to the reset input R of the counter 46.

Figure 6:
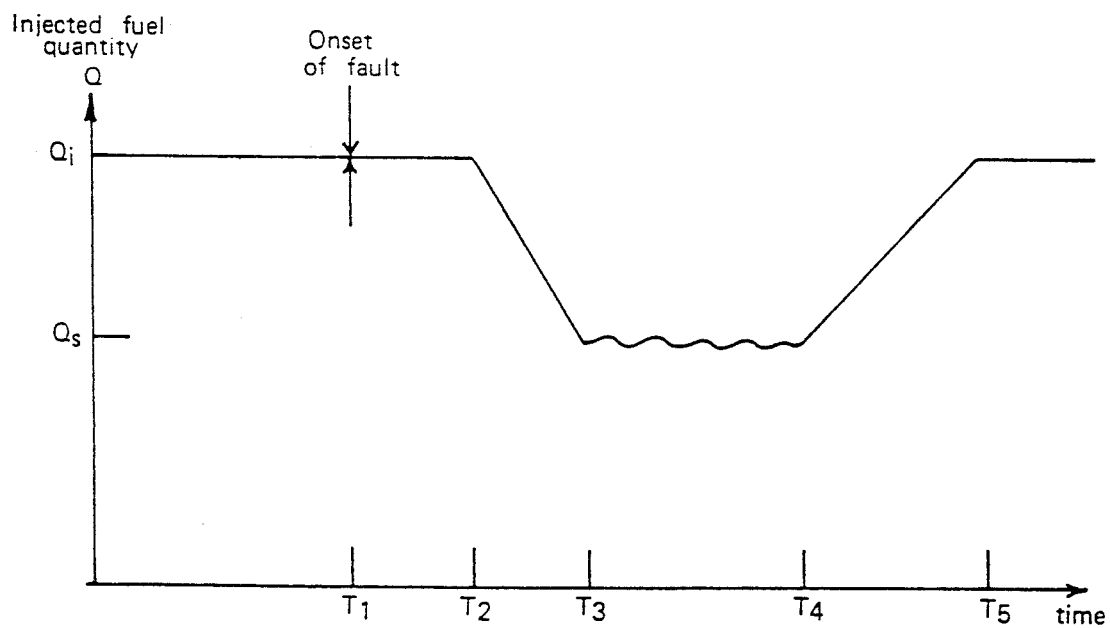
FIG. 6 is a graph illustrating the operation of the system of FIG. 5.

FIG. 6 is a graph in which injected fuel quantity Q is plotted against time and shows the operation of the circuit of FIG. 5 in the case of a diesel engine. It is assumed that the EMS is operative to deliver the injected fuel quantity $Q_i$ desired by the driver, which quanity is larger than the precautionary quantity $Q_s$ described below. At instant $T_1$, it is assumed that the driver lifts his foot from the accelerator pedal and applies the brake but that the accelerator pedal sticks in a depressed condition. The instant $T_1$ is thus the onset of a fault condition. The brake signal BS is passed by the AND gate 40 because the "inverted" idling position signal FFG-LL is still applied to the other input of this AND gate reaches the delay circuit 44. After a pre-programmable delay of, say, 2 seconds a reaction signal RS1 is produced at instant $T_2$ and is processed by the EMS, whereby the injected fuel quantity Q is reduced to a pre-programmed precautionary value $Q_s$ which is considered to be safe and to enable the vehicle to keep moving. According to an alternative function, the fuel quantity is reduced if the engine speed is above a value which is considered to be safe and the idling speed is controlled to this value.

The effect of the counter 46 is to cause the injected fuel quantity to decreased in a ramp-like manner so that the precautionary injected quantity $Q_s$ is not reached until instant $T_3$. The purpose of this ramp is to prevent the driver being startled by a sudden reduction in injected fuel quantity.

If the driver again depresses the accelerator pedal beyond its stuck position at the instant $T_4$ with the intention to increase the injected fuel quantity, the differentiator 48 supplies a signal to the reset input R of the counter 46. The latter causes the injected fuel quantity to rise again in a pre-programmable ramp-like manner, whereby the injected quantity returns to the value $Q_i$ intended by the driver only at the instant $T_5$.

The rectifier gate 50 prevents the safety conditions being removed in the event that the accelerator pedal releases itself, e.g., upon removal of the rucked footmat, whereby the injected fuel quantity cannot be increased above its precautionary value $Q_s$ until the driver again depresses the accelerator pedal.

Figure 7:
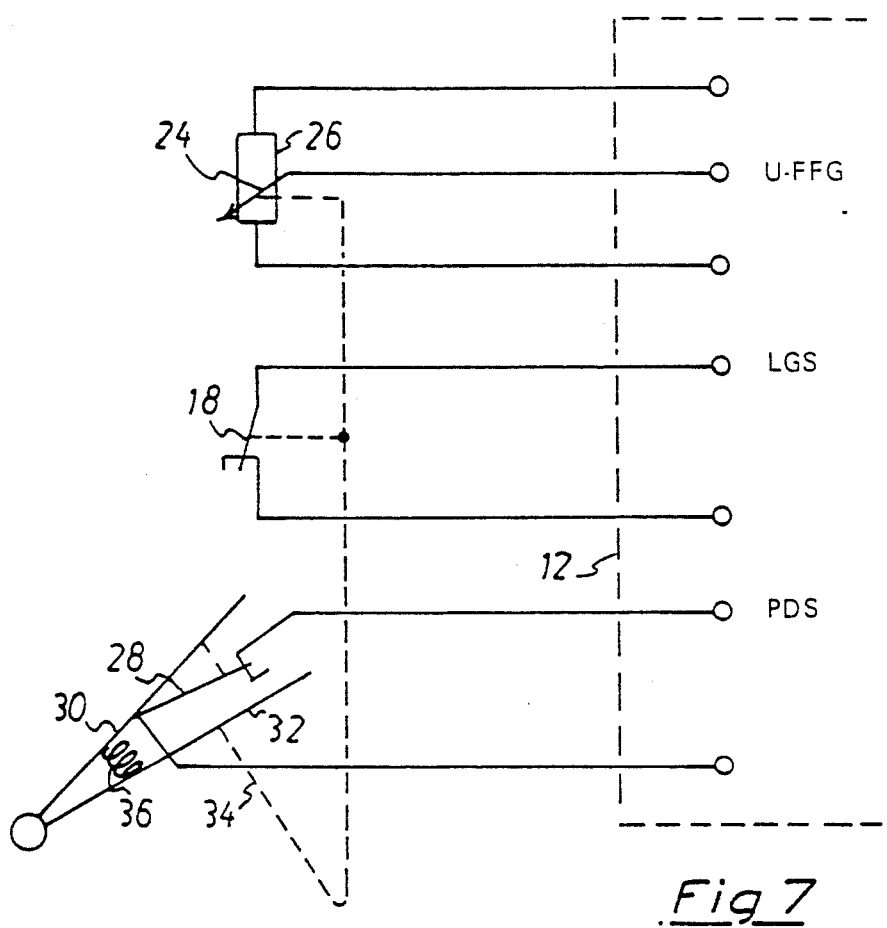
FIG. 7 is a circuit diagram of an embodiment of a supervisory system employing two redundant signals.

It is irksome for the driver to have to drive no faster than the relatively low speed achievable with the above-mentioned precautionary injected fuel quantity $Q_s$ which corresponds to a quantity only slightly above the idling quantity. This disadvantage can be avoided by using two redundant signals, as shown in FIG. 7, whereby two faults must occur in the supervisory circuits before the driving conditions are adversely effected. The circuit shown in FIG. 7 employs the pressure switch (28) of FIG. 3, which is mechanically actuated by the potentiometer slider 24 of FIG. 1 and also the idling switch 18 of FIG. 1.

As described with reference to FIG. 6, the effect of a fault in the idling switch 18 or in the pressure switch 28 is to cause the injected fuel quantity to be reduced to a relatively low safe value $Q_s$ in a ramp-like manner. The circuits shown in FIGS. 8 and 9 are designed to enable the engine to return to normal operation in the event of detection of a fault in the pressure switch 28.

Figure 8:
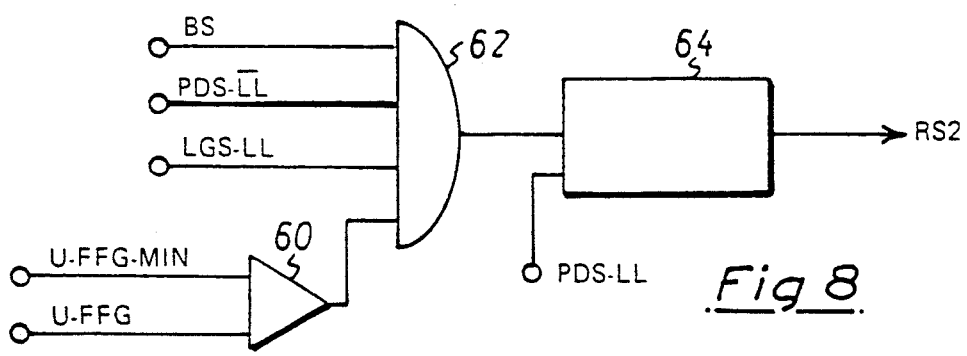
FIG. 8 is a diagram of a circuit for checking whether a pedal pressure switch has stuck in the idling position.

The circuit of FIG. 8 is designed to produce a reaction signal RS2 if the pressure switch 28 of FIG. 7 should fail to return to its no-load position. Should the signal BS from the brake light switch, the signal LGS-LL from the idling switch 18 and a signal from a comparator 60 which compares the transducer output U-FFG with a voltage U-FFG MIN corresponding to a speed slightly above idling, all indicate that the driver is braking, that the output of the pedal travel transducer 26 corresponds to the idling position and that the pedal travel transducer is actually in its idling position, and should the signal PDS-LL from the pressure switch 28 suggest that the pedal is depressed, an AND gate 62 delivers an output to an integrator 64. After an adjustable total delay of 5 sec to 2 min obtained by means of the integrator 64, the reaction signal RS2 is produced and causes the main computer 12 to disregard the signal from the pressure switch 28. At the same time, the driver is warned of the faulty switch. Should the fault be removed, for example by re-positioning a rucked footmat, the idling position signal PDS-LL from the pressure switch 28 re-sets the integrator 64.

Figure 9:
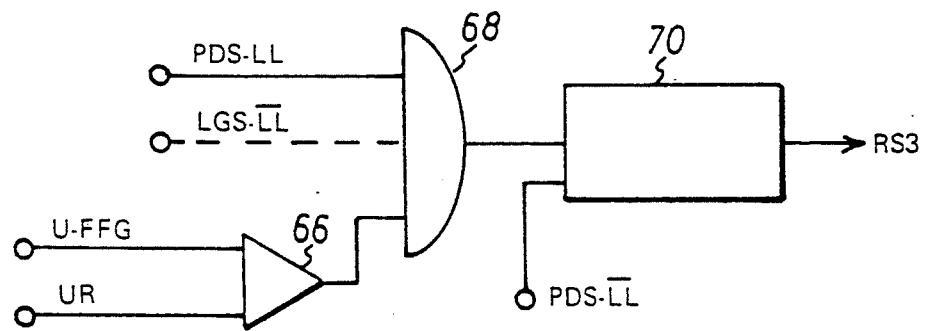
FIG. 9 is a diagram of a circuit for checking whether the pedal pressure switch has stuck in the full or partial load position.

The circuit of FIG. 9 is designed to produce a reaction signal R3 should the pressure switch 28 indicate a no-load position even when the accelerator pedal 30 is depressed towards its full load position. A comparator 66 compares the transducer output U-FFG with a reference voltage UR to produce a signal when the pedal travel transducer 26 indicates a pedal position of at least, say, 50% of full load. Should the signal PDS-LL from the pressure switch 28 suggest that the pedal 30 is in its no-load position, and AND gate 68 delivers a signal to a counter 70. Should there be several, say two, occasions when this contradiction occurs, the counter 70 delivers a reaction signal RS3 which is used by the computer 12 to cause the injected fuel quantity to rise from the precautionary value $Q_S$, to which it will have previously been set as described with reference to FIGS. 5 and 6, to its intended value $Q_i$ in a ramp-like manner. At the same time, the driver is warned of the defective pressure switch. Should the defect be removed, a signal PDS-LL indicative that the pressure switch is not in its no-load position resets the counter 70.

Instead of or in addition to the output of the comparator 66, the signal LGS-LL, indicating that the pedal travel transducer 26 is not in its no-load or idling position, can be fed to the AND gate 66, as indicated by a dotted line.

Figure 10:
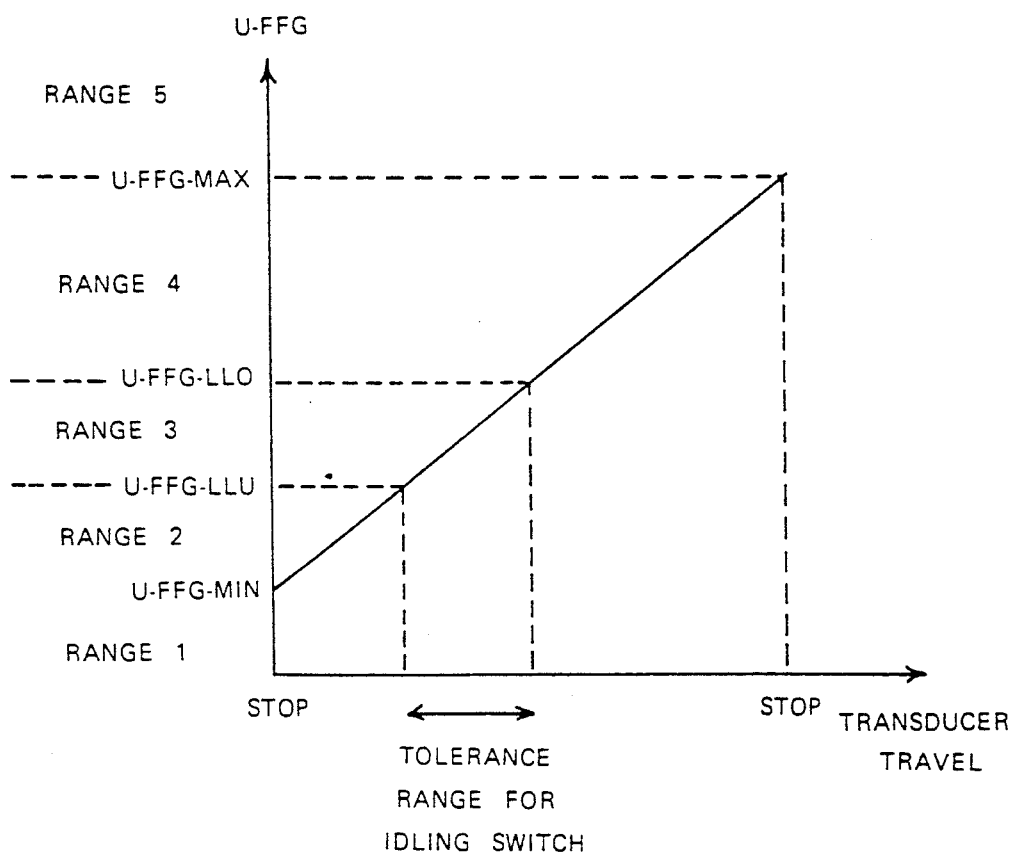
FIG. 10 is a graph, similar to that of FIG. 2, but relating to the embodiment of FIGS. 7 to 9.

The function of the circuits of FIGS. 8 and 9 is to indicate that the pressure switch 28 of FIG. 7 is intact by means of agreement between the pedal travel transducer voltage, the idling switch and the pressure switch over one plausibility phase above no-load and in no-load. FIG. 10 is graph and Table 3 is a plausibility diagram, representing operation of the supervisory system of FIG. 7. Table 4 is a plausibility diagram showing optional modifications which can be made for range 1 to range 5.

TABLE 3

| actual transducer output voltage (U-FFG) | idling switch | pressure switch | processed value or symptom | diagnosis |
|---|---|---|---|---|
| range 1 | X | X | elevated idling speed | faulty transducer |

TABLE 3-continued

| actual transducer output voltage (U-FFG) | idling switch | pressure switch | processed value or symptom | diagnosis |
|---|---|---|---|---|
| range 2 | LL | LL | U-FFG | — |
|  | LL | $\overline{LL}$ | U-FFG | — |
|  | $\overline{LL}$ | LL | elevated idling speed | faulty idling switch |
|  | $\overline{LL}$ | $\overline{LL}$ | elevated idling speed | faulty transducer |
| range 3 | LL | LL | elevated idling speed | faulty pressure switch |
|  | LL | $\overline{LL}$ | U-FFG | — |
|  | $\overline{LL}$ | LL | elevated idling speed | faulty pressure switch |
|  | $\overline{LL}$ | $\overline{LL}$ | U-FFG | — |
| range 4 | LL | LL | elevated idling speed | faulty transducer |
|  | LL | $\overline{LL}$ | U-FFG; limited fuel quantity | faulty idling switch |
|  | $\overline{LL}$ | LL | elevated idling speed | faulty pressure switch |
|  | $\overline{LL}$ | $\overline{LL}$ | U-FFG | — |
| range 5 | X | X | elevated idling speed | faulty transducer |

TABLE 4

| actual transducer output voltage (U-FFG) | idling switch | pressure switch | processed value or symptom | diagnosis |
|---|---|---|---|---|
| range 1 | LL | LL | normal idling speed | — |
|  | $\overline{LL}$ | $\overline{LL}$ | elevated idling speed | faulty transducer |
| range 2 | LL | LL | U-FFG | — |
|  | LL | $\overline{LL}$ | U-FFG | — |
|  | $\overline{LL}$ | LL | elevated idling speed | faulty idling switch |
|  | $\overline{LL}$ | $\overline{LL}$ | elevated idling speed | faulty transducer |
| range 3 | LL | LL | elevated idling speed | faulty pressure switch |
|  | LL | $\overline{LL}$ | U-FFG | — |
|  | $\overline{LL}$ | LL | elevated idling speed | faulty pressure switch |
|  | $\overline{LL}$ | $\overline{LL}$ | U-FFG | — |
| range 4 | LL | LL | elevated idling speed | faulty transducer |
|  | LL | $\overline{LL}$ | U-FFG; limited fuel quantity | faulty idling switch |
|  | $\overline{LL}$ | LL | elevated idling speed | faulty pressure switch |
|  | $\overline{LL}$ | $\overline{LL}$ | U-FFG | — |
| range 5 | LL | LL | normal idling speed | faulty transducer |
|  | $\overline{LL}$ | $\overline{LL}$ | elevated idling speed | faulty transducer |

In the event of a defect in the pressure switch being diagnosed, the signal from the pressure switch is ignored. In the event of a further defect, the injected fuel quanity is limited to the precautionary value.

We claim:

1. A supervisory system for monitoring an accelerator pedal travel transducer in an electronic control system for a combustion engine, the system comprising:
   an idling pressure switch for detecting the idling position of the accelerator pedal;
   means for actuating said pressure switch by taking up lost motion travel of the accelerator pedal from said idling position before said pedal transducer is displaced from said idling position;
   means for providing an additional idle position signal;
   composite means having respective inputs for receiving said additional idle position signal, the signal of said idling pressure switch and the signal of said accelerator pedal transducer; and,
   said composite means being provided for generating an alarm signal in response to said signals applied to said inputs when at least one of said signals applied to said inputs is not plausible to the remaining ones of said signals applied to said inputs.

2. The supervisory system of claim 1, wherein the operation of the accelerator pedal through said lost motion travel is executed against a relatively light spring force from a stop position to an idling position at which the pedal transducer begins to respond.

3. The supervisory system of claim 1, wherein a reaction signal (RS3) is produced when the signal (PDS-LL) from the pressure switch indicates that the accelerator pedal is released, whereas at least one other signal (U-FFG, LGS-LL) indicates that the accelerator pedal is in at least one of a part load position and a full load position, and this reaction signal (RS3) is used to cause the signal (LGS-LL) from the pressure switch to be disregarded when determining whether there is a fault on the pedal travel transducer.

4. The supervisory system of claim 1, wherein the idling switch is closed in the idling position of at least one of the accelerator pedal and the pedal travel transducer and the pressure switch is open in said idling position.

5. A supervisory system for monitoring an accelerator pedal travel transducer in an electronic control system for a combustion engine, the system comprising:
   an idling pressure switch for detecting the idling position of the accelerator pedal;
   means for actuating said pressure switch by taking up lost motion travel of the accelerator pedal from said idling position before said pedal transducer is displaced from said idling position; and,
   no fault in the pedal travel transducer being diagnosed over tolerance ranges of triggering of the pressure switch and the putput signal (U-FFG) of the travel transducer, in that no fault signal is obtained over the cumulative transducer output range (U-FFG-MIN to U-FFG-LLO) corresponding to these tolerance ranges whether the pressure switch is open or closed.

6. A supervisory system for monitoring an accelerator pedal travel transducer in an electronic control system for a combustion engine, the system comprising:
   an idling pressure switch for detecting the idling position of the accelerator pedal;
   means for actuating said pressueree switch by taking up lost motion travel of the accelerator pedal from said idling position before said pedal transducer is displaced from said idling position; and,
   an additional idling switch which is operatively connected to the pedal travel transducer, the actual output signal (U-FFG) from the pedal travel transducer being interpreted and compared with an output signal to be expected when the pedal travel transducer is at least close to the idling position and a fault indication is produced when the result of such comparison contradicts at least one of the transducer position information (LGS) derived from the idling switch and the pedal position information (PDS) obtained from the pressure switch.

7. The supervisory system of claim 6, wherein a reaction signal (RS2) is produced when the signal (PDS-LL) from the pressure switch indicates that the accelerator pedal is not in its idling position, whereas at least two other signals (BS, LGS-LL, U-FFG) indicate that the accelerator pedal is at least close to its idling position, and this reaction signal (RS2) is used to cause the signal (LGS-LL) from the pressure switch to be disregarded when determining whether there is a fault on the pedal travel transducer.

8. The supervisory system of claim 7, wherein a brake pressure signal (BS), indicative that the brakes are applied, is used to indicate that the accelerator pedal is in its idling position.

9. The supervisory system of claim 7, further comprising an integrator for delaying production of the reaction signal (RS2) by an adjustable period.

10. The supervisory system of claim 7, wherein a brake pressure signal (BS), indicative that the brakes are applied, is used to indicate that the accelerator pedal ought to be in its idling position.

11. A supervisory system for monitoring an accelerator pedal travel transducer is an electronic control system for a combustion engine, the system comprising:
   an idling pressure switch for detecting the idling position of the accelerator pedal;
   means for actuating said pressure switch by taking up lost motion travel of the accelerator pedal from said idling position before said pedal transducer is displaced from said idling position;
   a reaction signal (RS3) is produced when the signal (PDS-LL) from the pressure switch indicates that the accelerator pedal is released, whereas at least one other signal (U-FFG, LGS-LL) indicates that the accelerator pedal is in at least one of a part load position and a full load position, and this reaction signal (RS3) is used to cause the signal (LGS-LL) from the pressure switch to be disregarded when determining whether there is a fault on the pedal travel transducer; and,
   a counter for counting instances of contradiction between the pressure switch signal (PDS-LL) and at least one of the signals (U-FFG, LGS-LL) to postpone production of the reaction signal (RS3) until there have been at least two, such instances.

12. A supervisory system for monitoring an accelerator pedal travel transducer in an electronic control system for a combustion engine, the system comprising:
   an idling switch for detecting the idling position of the accelerator pedal;
   means for interpreting the actual output signal (U-FFG) from the pedal travel transducer and comparing said actual output signal (U-FFG) to an output signal to be expected when the accelerator pedal is at least close to the idling position and for producing a fault indication when the information obtained from the comparison contradicts the pedal position information derived from the idling switch; and,
   said idling switch being closed in the idling position of at least one of the accelerator pedal and the pedal travel transducer.

13. The supervisory system of claim 12, wherein the idling switch is arranged to be triggered from one state to the other at a position at which the output signal U-FFG of the pedal travel transducer is relatively close to the value U-FFG-MIN obtained when the pedal is against its idling stop.

14. The supervisory system of claim 13, wherein no fault in the pedal travel transducer is diagnosed over a tolerance range of triggering of the idling switch in that no fault signal is obtained over the transducer output range corresponding to this tolerance range, whether the idling switch is open or closed.

15. The supervisory system of claim 14, wherein a fault signal is obtained when the pedal travel transducer output (U-FFG) is at a value below the lower tolerance range value (U-FFG-LLU) and simultaneously the idling switch output signal (LGS) indicates that the accelerator pedal is not in its idling position.

16. The supervisory system of claim 12, wherein the idling switch is integrated into the pedal travel transducer.

17. The supervisory system of claim 12, wherein a fault signal is obtained when the output (U-FFG) of the pedal travel transducer is below a lower value (U-FFG-MIN) irrespective of the position of at least one of the idling switch and the pressure switch.

18. The supervisory system of claim 12, wherein a fault signal is obtained when the output (U-FFG) of the pedal travel transducer is above an upper value (U-FFG-MAX), irrespective of the position of at least one of the idling switch and the pressure switch.

19. The supervisory system of claim 12, wherein the outputs (FFG-LL, BS) of at least one of the idling switch and the pressure switch and the output of a brake switch responsive to actuation of the vehicle brakes are compared to produce a reaction signal (RS1) if at least one of the accelerator pedal and the accelerator pedal travel transducer is remote from its idling position when the brakes are actuated.

20. A supervisory system for monitoring an accelerator pedal travel transducer in an electronic control system for a combustion engine installed in a vehicle, the system comprising:
- an idling switch for detecting the idling position of the accelerator pedal and for producing an idling switch output signal;
- a brake switch for responding to the actuation of the brakes of the vehicle and for producing a brake switch output signal; and,
- means for comparing said idling switch output signal and said brake switch output signal to produce a reaction signal if at least one of the accelerator pedal and the accelerator pedal travel transducer is remote from its idling position when the brakes are actuated.

21. The supervisory system of claim 20, wherein the electronic engine control so responds to the reaction signal (RS1) that the engine power is thereby reduced to a predetermined safe value $Q_S$.

22. The supervisory system of claim 20, wherein the electronic engine control so responds to the reaction signal (RS1) that the engine power is thereby reduced if the engine speed is above a safe value and the engine speed is controlled down to this safe value.

23. The supervisory system of claim 21, wherein the electronic engine control only responds to the reaction signal (RS1) after a delay time.

24. The supervisory system of claim 21, wherein the engine power is gradually reduced by the electronic engine control in response to the reaction signal (RS1).

25. The supervisory system of claim 21, wherein the reaction signal (RS1) is discontinued in response to a change in the output (U-FFG) of the accelerator pedal travel transducer.

26. The supervisory system of claim 25, wherein the reaction signal (RS1) is discontinued only in response to an increase in the transducer output (U-FFG) but not in response to a decrease.

27. The supervisory system of claim 25, wherein the engine power is gradually increased by the electronic engine control following discontinuance of the reaction signal (RS1).

* * * * *

UNITED STATES PATENT AND TRADEMARK OFFICE
CERTIFICATE OF CORRECTION

PATENT NO. : 5,150,681                          Page 1 of 3

DATED : September 29, 1992

INVENTOR(S) : Hermann Kull, Joachim Berger, Ulrich Gerstung and Klaus Bleuel

It is certified that error appears in the above-indentified patent and that said Letters Patent is hereby corrected as shown below:

In column 1, line 8: after "engine", insert -- (internal or external). --.

In column 1, line 29: between "in" and "carburetor", insert -- a --.

In column 1, line 48: delete "injectd" and substitute -- injected -- therefor.

In column 2, line 1: delete "EP-A-0109478" and substitute -- United States Patent 4,488,527 -- therefor.

In column 2, line 2: delete "does" and substitute -- is -- therefor.

In column 7, line 17: between "gate" and "reaches", insert -- and --.

In column 7, line 28: delete "decreased" and substitute -- decrease -- therefor.

UNITED STATES PATENT AND TRADEMARK OFFICE
CERTIFICATE OF CORRECTION

PATENT NO. : 5,150,681

DATED : September 29, 1992

INVENTOR(S) : Hermann Kull, Joachim Berger, Ulrich Gerstung and Klaus Bleuel It is certified that error appears in the above-identified patent and that said Letters Patent is hereby corrected as shown below:

In column 7, line 54: delete "effected" and substitute -- affected -- therefor.

In column 8, line 10: delete "U-FFG MIN" and substitute -- U-FFG-MIN -- therefor.

In column 8, line 40: delete "$Q_S$," and substitute -- $Q_S{'}$ -- therefor.

In column 8, line 58: between "is" (first occurrence) and "graph", insert -- a --.

In column 11, line 29: delete "putput" and substitute -- output -- therefor.

In column 11, line 40: delete "pressuree" and substitute -- pressure -- therefor.

In column 12, line 9: delete "is" and substitute -- in -- therefor.

UNITED STATES PATENT AND TRADEMARK OFFICE
CERTIFICATE OF CORRECTION

PATENT NO. : 5,150,681

DATED : September 29, 1992

INVENTOR(S) : Hermann Kull, Joachim Berger, Ulrich Gerstung and Klaus Bleuel It is certified that error appears in the above-identified patent and that said Letters Patent is hereby corrected as shown below:

In column 12, line 32: after "two", delete -- , --.

In column 14, line 8: delete "$Q_S$" and substitute -- $Q_s$ -- therefor.

Signed and Sealed this

Twenty-sixth Day of October, 1993

Attest:

BRUCE LEHMAN

Attesting Officer     Commissioner of Patents and Trademarks